March 30, 1965   J. G. WISTREICH   3,175,382
FORGING
Filed Oct. 30, 1961
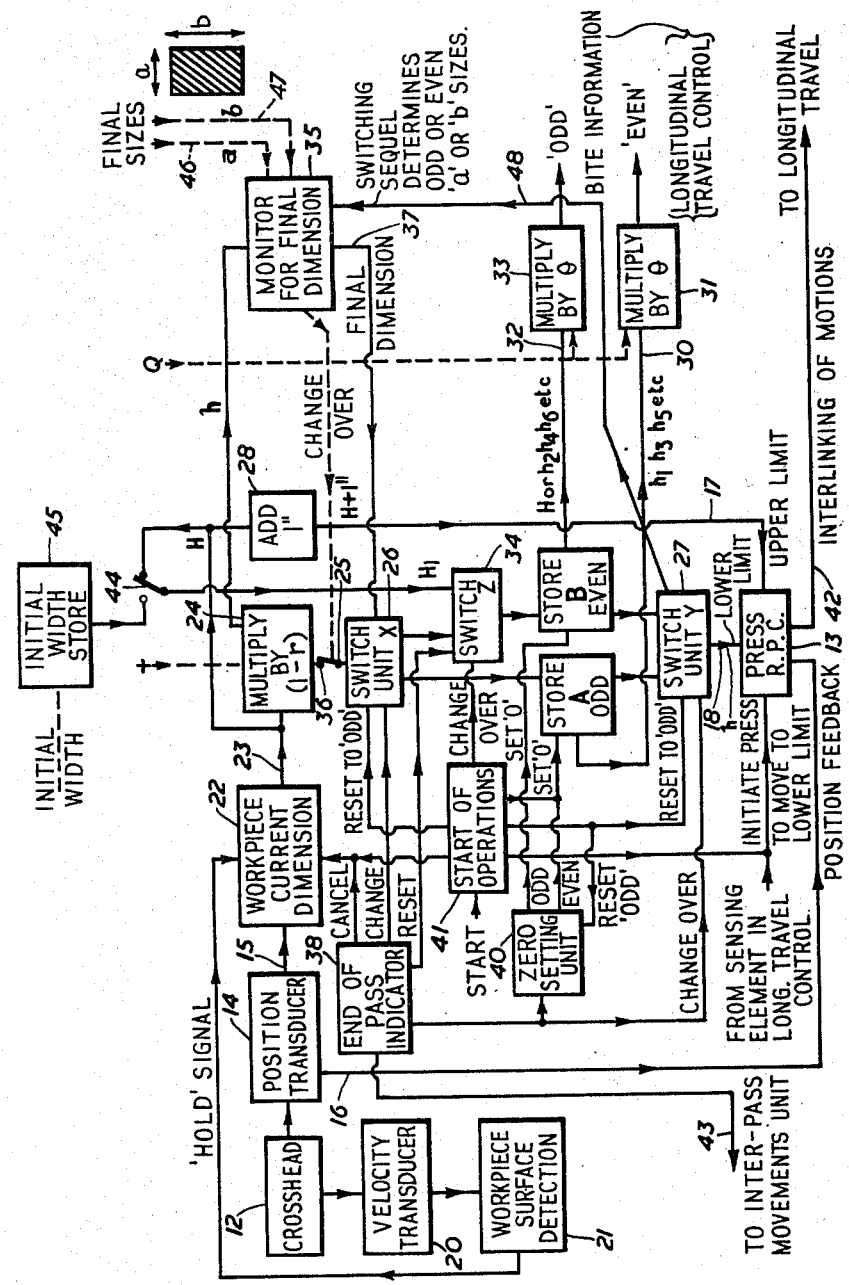
INVENTOR
*J. G. Wistreich*
BY
ATTORNEY

United States Patent Office

3,175,382
Patented Mar. 30, 1965

3,175,382
FORGING
John George Wistreich, Belmont, England, assignor to
The British Iron and Steel Research Association
Filed Oct. 30, 1961, Ser. No. 148,504
Claims priority, application Great Britain, Nov. 2, 1960,
37,674/60
16 Claims. (Cl. 72—9)

This invention relates to forging and is particularly concerned with the combination of a forging press and a manipulator, by which a workpiece may be forged to a required shape in a succession of passes; in each of the passes one or more squeezes being given to the workpiece by the press, the workpiece being moved by the manipulator between successive squeezes in order to present different portions of the surface to the press after each squeeze, and the workpiece being positioned between successive passes.

It is usual for such forging operations to make use of manual control of both the press and the manipulator for each squeeze, and an object of the present invention is to reduce the amount of such manual control exerted during forging operations.

According to the present invention there is provided apparatus for forging a workpiece in a succession of squeezes which apparatus comprises means responsive to the initial width of the workpiece, and means controlled by those responsive means for controlling the relative movement between the workpiece and the forging tools between successive squeezes to a prescribed proportion of the initial width.

Various proposals have already been made in U.S. Patents Nos. 3,036,253, 2,922,053 and 3,118,306, and L. N. Bramley's application Ser. No. 852,272, filed November 12, 1959 for the control of individual forging functions which are taken into account by the different aspects of the present invention, and more particular reference will be made to these specifications in the following description, by way of example, of the different aspects and forms of this invention with reference to the accompanying drawing, the single figure of which illustrates in schematic form a forging pass control arrangement according to the present invention.

For the purpose of describing the operation of drawing the workpiece is assumed to be initially of substantially square cross-section and is to be reduced by forging to smaller square cross-section of prescribed dimension. Forging is effected in a sequence of passes, in each of which the workpiece is moved between consecutive squeezes of the press, but is not turned between squeezes. The minimum separation of the press tools for each squeeze of any one pass is the same, so that, at the end of a pass, the workpiece has constant thickness. Between passes, the workpiece is turned through 90° so that it is forged alternately on two sets of surfaces at right angles to one another.

The forging press may be as described in the above U.S. specifications, with a control system as described in that specification for automatically controlling the movement of the press tools between predetermined upper and lower limits. The workpiece is carried by a manipulator which may be as described in L. N. Bramley's application Ser. No. 852,272, filed November 12, 1959 now Patent Number 3,139,569, with a control system as described in that specification for automatically controlling the movement of the manipulator, and hence of the workpiece relative to the press tools, longitudinally, vertically and rotationally. In particular, the manipulator can be controlled automatically to move the workpiece in the direction of its length through a prescribed distance between each successive pairs of squeezes of the press tools during a pass.

It has been found, for the present example of reducing a square cross-section workpiece, that the workpiece can be forged from square cross-section to rectangular cross-section during one pass, and forged from that rectangular cross-section to a reduced square cross-section compared to the preceding square cross-section during the subsequent pass by observing predetermined relationships for the reduction during the two passes in question and the longitudinal workpiece movements between squeezes, that is, the bites, during those passes.

The latter predetermined relationhips in this instance are namely that the reduction $r$ should be maintained to a constant proportion of the initial workpiece thickness during each of the passes in question, and that the ratio of the bite compared to the initial width of the workpiece during each of those passes should be maintained constant. This second relationship will be denoted as $\theta$.

In U.S. Patent No. 3,118,306, there is described a control system to be used in connection with those of U.S. Patents Nos. 2,922,053 and 3,036,753 for automatically controlling the minimum separation of the press tools in any pass by the thickness of the workpiece at the start of that pass. Thereby, the final thickness of the workpiece at the end of a pass is a prescribed proportion of the initial depth. Although that system is fully described in U.S. Patent No. 3,118,306, it is also illustrated in the drawing of the accompanying drawing, in sufficient detail to render it understandable. In the drawing the crosshead 12 of the forge is controlled by a remote position control system 13, as described in U.S. Patents Nos. 3,036,253 and 2,922,053, this control system 13 setting the upper and lower limits of the reciprocation of the crosshead 12, and so of the upper press tool. The crosshead 12 is coupled to a position transducer 14, which may be a potentiometer and which gives a signal on lines 15, 16 according to the position of the crosshead. The signal on line 16 is applied to the control system 13 and compared with signals on lines 17, 18 representing respectively the required upper limit and lower limit of movement of the crosshead. The crosshead 12 is also coupled to a velocity transducer 20 which controls through a workpiece surface detector 21 a device 22 for indicating the initial thickness of the workpiece. Device 22 is supplied with the signal on line 15, representing the current separation of the press tools and, when the press tools first engage the workpiece, a signal is applied by the detector 21 to prevent further variation of the output signal from the device 22. Therefore, once the press tools have gripped the workpiece, the signal on line 23 represents the initial thickness of the workpiece. The signal on line 23 is applied to a multiplier 24 where it is multiplied by a factor $(1-r)$, $r$ being the required reduction for the squeeze. The output voltage on line 25 is applied, by means of a switch unit 26 to a store A on odd numbered passes and to store B on even numbered passes. The stored data in stores A, B is supplied to the remote position control system 13 to represent the lower limit of movement of the press tools, through a switch 27 which is changed over at the end of each pass and which is connected to store A on odd passes and to store B on even passes.

The signal on line 23 is also applied to an adder 28, where a preset value, such as one inch, is added to the signal on line 23 representing the initial thickness of the workpiece. The output from adder 28 is also applied to the remote position control system 13 to set the upper limit of movement of the press tools. Therefore, after each squeeze, the press tools are separated by an amount exceeding the initial thickness of the workpiece, to enable the workpiece to be moved by the manipulator for the next squeeze. In the result, during a pass, the forge is reciprocated between an upper position corresponding to the initial thickness of the workpiece plus an added amount, and a lower position, set by a required proportion of the initial thickness.

The operation of the bite control system depends on the fact that when the workpiece is turned through 90° between successive passes, the thickness to which the workpiece has been forged in one pass becomes the initial width of the forging in the next pass. The bite, or the amount by which the workpiece moves between successive squeezes in a pass, is controlled to be a preset proportion $\theta$ of the initial width of the workpiece at the beginning of the pass. For this purpose, the data stored in store A on odd passes is employed to control the manipulator movement in the next even pass, while the data stored in store B on even passes is used to control the manipulator on the next (odd) pass. For this purpose, store A emits on line 30 a signal representing the store information to a multiplier 31, where that data is multiplied by a factor $\theta$ previously set into the system. The output from multiplier 31 controls the longitudinal travel of the manipulator on even passes. Similarly, the output from store B on line 32 is multiplied by the same factor $\theta$ in multiplier 33 and employed to control the longitudinal travel of the manipulator, between squeezes, on the odd passes.

For the first pass of a forging, there is, of course, no preceding pass and therefore no data stored in either store A or store B. However, since the workpiece is assumed to be initially of square section, the initial thickness of the workpiece is also its initial width. Therefore the initial thickness signal on line 23 is applied to a switch 34 which, on the first pass only, transmits it to store B for use in the first pass, only. Switch 34 is arranged to connect store B to line 23 via a switch 44 during the first pass and to switch unit 26 on subsequent passes. If the workpiece is initially rectangular and not square in section, switch 44 is changed over to apply to switch 34 a signal from store 45 representing the initial width rather than the signal on line 23 represenitng the initial thickness.

The final dimensions required for the workpiece are set in to a monitor 35 on lines 46, 47. On each pass, the signal from the multiplier 24 representing the minimum separation of the work tools to be used in that pass is compared in the monitor 35, on odd numbered passes, with the signal on line 47, monitor 35 being controlled by switch unit 27 through line 48 for this purpose. If the minimum separation is less than the final size represented by the signal on line 46, or 47, then the monitor opens a switch 36 in line 25 and renders the multiplier 24 inoperative to control the minimum separation, or lower limit of the press for that pass. Instead the switch unit 26 is supplied with a signal on line 37 representing the final dimension selected in that pass by switch unit 27. As a result, the workpiece is forged down to rectangular section with dimensions as determined by the values set in on lines 46, 47. Of course, where the workpiece final section is to be square, as assumed for the present example, it is necessary to set only one final dimension in monitor 35 and it is unnecessary to control monitor 35 by switch unit 27. Instead, the depth of the workpiece at the end of each pass is compared with the single value set into monitor 35.

The system also includes an end-off-pass indicator 38, which emits signals at the end of a pass and which controls a zero setting unit 40, and a start-of-operation unit 41 which initiates the operation of the whole control circuit.

When the unit 41 is operated, it sets to zero store A, resets the switch units 26, 27 to their positions for odd passes, changes over switch 34 to connect it to line 23 and initiates the press to start the crosshead to move downwardly.

This will then be the state of the apparatus when initiating an operation, and when the press tools first grip the workpiece, the signal on line 23 representing the thickness of the workpiece is multiplied in multiplier 24 and stored in store A; the lower limit of the press reciprocation for the first pass is thereby set. Similarly, the upper limit of the reciprocation is set by the signal on line 17. At the same time, the initial thickness, as represented by the signal on line 23, or, in the case of rectangular workpiece, the initial width as represented by the signal from store 45 is applied through switch 34 to store B and is operative during the pass to determine the movement of the manipulator between successive squeezes. A signal is supplied by the control system 13 on line 42 to initiate the inter-squeeze manipulator movement as soon as the workpiece is released by the forge on the up-stroke. Therefore, the forging press continues to reciprocate, with manipulator movement between successive squeezes, until the end of the pass is reached.

At the end of the pass, the indicator 38 operates through line 43 the manipulator for the inter-pass movements; in this case, the workpiece will be turned through 90° and brought back to its initial longitudinal position with respect to the forge. The indicator 38 also unlocks the device 22 so as to make it responsive to further signals from the position transducer 14. Indicator 38 also changes over switch unit 26, and resets switch 34, so that in the second pass store B receives data from multiplier 24. Further, the indicator 38 operates the zero setting unit 40 to reset to zero store B in odd passes and store A in even passes, and changes over switch unit 27, so that in the second pass the control system 13 receives signals from store B.

In the second pass, the lower limit of press tool movements is derived from the data stored in store B in that pass, the upper limit is, as before, derived from line 17, and the bite information is derived from the data stored in store A from the first pass.

The press and manipulator are similarly controlled in successive passes. In each of these passes, the output from the multiplier 24 is compared with the final dimension or dimensions set in monitor 35, as described. When the value represented by the signal from multiplier 24 is less than the required final dimension, monitor 35 opens switch 36 so that data regarding the final dimension is fed into store A or store B, according to whether the current pass is even or odd, so that the press tool is controlled to a lower limit equal to the final dimension. This pass is succeeded by a number of similar passes sufficient to bring the workpiece to the desired dimensions, the lower limit of press movement in each such pass being controlled by monitor 35.

It will be appreciated that once the squeeze factor has been set in multiplier 24, the bite factor has been set in the multipliers 31, 33 and the final size has been set into the monitor 35, the operation of the press and manipulator is entirely automatic until the workpiece has been forged down to the required size, regardless of the initial dimensions of the workpiece.

In the above description of the drawing reference has been made to various position indicating transducers, and for convenience the example of potentiometer form for such transducers has been mentioned for consistency with the particular disclosures of the earlier specifications also referred to. However, it will be appreciated that such forms of transducers are more usually associated with apparatus for operation with analogue-type control signals. Where it is desired to employ a digital-type system, these transducers will incorporate so-called "digitisers" for providing position representative or position control signals in digital form.

While the above operation has been described in relation to an initially square or rectangular workpiece, workpieces of other cross-section shapes may be similarly forged if required, since the forging operation causes the shape of the workpiece to tend more and more to square or rectangle as forging proceeds.

I claim:
1. A method of forging a workpiece in a succession of squeezes by use of a forging press, which method comprises moving the workpiece longitudinally relative to the press intermediate successive ones of said succession of squeezes, and controlling such longitudinal movement in response to the initial width of the workpiece.

2. A method of forging a workpiece in a sequence of passes each including a succession of squeezes by use of a forging press, which method comprises moving the workpiece longitudinally relative to the press intermediate successive squeezes of each pass, maintaining such longitudinal movement during each pass as a constant proportion of the initial width of the workpiece for the pass in question, and turning the workpiece about its axis between successive passes by a constant angle.

3. A method of forging a workpiece in a succession of squeezes by use of a forging press, which method comprises controlling the reduction in workpiece thickness by each press squeeze in response to the initial thickness of the workpiece for the squeeze in question, moving the workpiece longitudinally relative to the press intermediate successive ones of said succession of squeezes, and controlling such longitudinal movement in response to the initial width of the workpiece.

4. A method of forging a workpiece in a sequence of passes each including a succession of squeezes by use of a forging press, which method comprises maintaining the reduction in workpiece thickness by each press squeeze as a constant proportion of the initial thickness of the workpiece for the squeeze in question, moving the workpiece longitudinally relative to the press intermediate successive squeezes of each pass, maintaining such longitudinal movement during each pass as a constant proportion of the initial width of the workpiece for the pass in question, and turning the workpiece about its axis by a right angle between successive passes.

5. A method according to claim 4, which method comprises comparing at the commencement of each pass the forged thickness of workpiece which will result from the initial thickness constant proportion reduction with the required thickness of workpiece, and, in the event that said forged thickness is less than said required thickness, controlling the reduction of workpiece thickness during the pass in question in response to said required thickness in place of the initial thickness.

6. A method of reducing an elongate workpiece of square cross-section in two passes each including a succession of squeezes by use of a forging press, which method comprises reducing the workpiece to a prescribed first proportion of its initial square dimension by each squeeze of the first pass, and moving the workpiece longitudinally relative to the press in one direction by a prescribed second proportion of its initial square dimension intermediate successive squeezes of said first pass; turning the workpiece through a right angle about its longitudinal axis after the first pass; and, after said turning, reducing the workpiece by each squeeze of the second pass to said prescribed first proportion of its initial thickness for the second pass, and intermediate successive squeezes of the second pass moving the workpiece longitudinally in the opposite direction to said one direction by said prescribed second proportion of the initial width of the workpiece for the second pass.

7. For a forging operation in which a workpiece is reduced in a succession of squeezes by use of a forging press, the workpiece being moved by a manipulator longitudinally relative to the press intermediate successive ones of said succession of squeezes: control apparatus, comprising first storage means for storing an electrical signal representation of the initial width of the workpiece, and first control means responsive to said storage means for controlling the workpiece manipulator.

8. Apparatus according to claim 7 wherein said first control means is responsive to said first storage means for controlling the workpiece manipulator to maintain the workpiece longitudinal movement intermediate successive squeezes as a prescribed first proportion of said initial width.

9. Apparatus according to claim 7 comprising second storage means for storing an electrical signal representation of the initial thickness of the workpiece, and second control means responsive to said second storage means for controlling the forging press.

10. Apparatus according to claim 8 comprising second storage means for storing an electrical signal representation of the initial thickness of the workpiece, and second control means responsive to said second storage means for controlling the forging press to maintain the workpiece reduction effected in each squeeze as a prescribed second proportion of said initial thickness.

11. For a forging operation in which a workpiece is reduced in a sequence of passes each including a succession of squeezes by use of a forging press, the workpiece being moved by a manipulator longitudinally relative to the press intermediate successive squeezes of each pass, and the workpiece being turned about its longitudinal axis by a right angle between successive passes: control apparatus, comprising first storage means for storing representations of the workpiece forged thickness during successive passes, and first control means responsive to said storage means for controlling the workpiece manipulator during a pass by the respective representation of the forged thickness during the respective immediately preceding pass, such representation affording a measure of workpiece initial width.

12. Control apparatus according to claim 11, wherein said first storage means comprises a first store for storing a representation of the workpiece forged thickness during odd-numbered passes, and a second store for storing a representation of the workpiece forged thickness during even-numbered passes, and wherein said first control means comprises switch means operable to connect the control means for response to said first store during even-numbered passes and to said second store during odd-numbered passes.

13. Apparatus according to claim 11 wherein said first control means is operable to control the manipulator to effect a workpiece longitudinal movement relative to the press intermediate successive squeezes of a pass as a prescribed first proportion of the forged thickness during the respective preceding pass.

14. Apparatus according to claim 11 comprising second storage means for storing a representation of the workpiece initial thickness during each pass, and second control means responsive to said second storage means for controlling the forging press.

15. Apparatus according to claim 13 comprising second storage means for storing a representation of the workpiece initial thickness during each pass, and second control means responsive to said storage means for controlling the forging press to maintain the workpiece reduction effected in each pass as a prescribed second proportion of said initial thickness.

16. Apparatus according to claim 15 comprising third storage means for storing representations of the required final forged dimensions of a workpiece, comparison means responsive to said second and third storage means for comparing during commencement of each pass said prescribed second proportion of the workpiece initial thickness with the corresponding final forged dimension, third control means responsive to said third storage means for controlling the forging press to reduce the workpiece in accordance with a required final forged dimension, and switch means responsive to said comparison means to operate in first and second states, the switch means operating in its first state to render said second control means effective and said third control means ineffective in the event that said prescribed second proportion of initial thickness is greater than the corresponding required dimension, and the switch means operating in its second state to render said third control means effective to control the forging press in response to said corresponding required dimension and to render said second control means ineffective in the event that said prescribed second proportion of initial thickness is less than said corresponding required dimension.

References Cited by the Examiner
UNITED STATES PATENTS
2,985,043  5/61  Roberts _____ 80—56.1

OTHER REFERENCES

The Making, Shaping and Treating of Steel, United States Steel Corporation, 7th edition 1957, pages 465–467.

WHITMORE A. WILTZ, *Primary Examiner.*
HYLAND BIZOT, *Examiner.*